Sept. 16, 1958     F. J. HOLZER     2,852,199
FOOD WASTE DISPOSER

Filed July 2, 1954     3 Sheets-Sheet 1

INVENTOR.
Frederick J. Holzer
BY
Mann, Brown and Hansmann

Sept. 16, 1958 F. J. HOLZER 2,852,199
FOOD WASTE DISPOSER
Filed July 2, 1954 3 Sheets-Sheet 2

INVENTOR.
Frederick J. Holzer
BY Mann, Brown and Hansmann
Attys.

Sept. 16, 1958 F. J. HOLZER 2,852,199
FOOD WASTE DISPOSER
Filed July 2, 1954 3 Sheets-Sheet 3
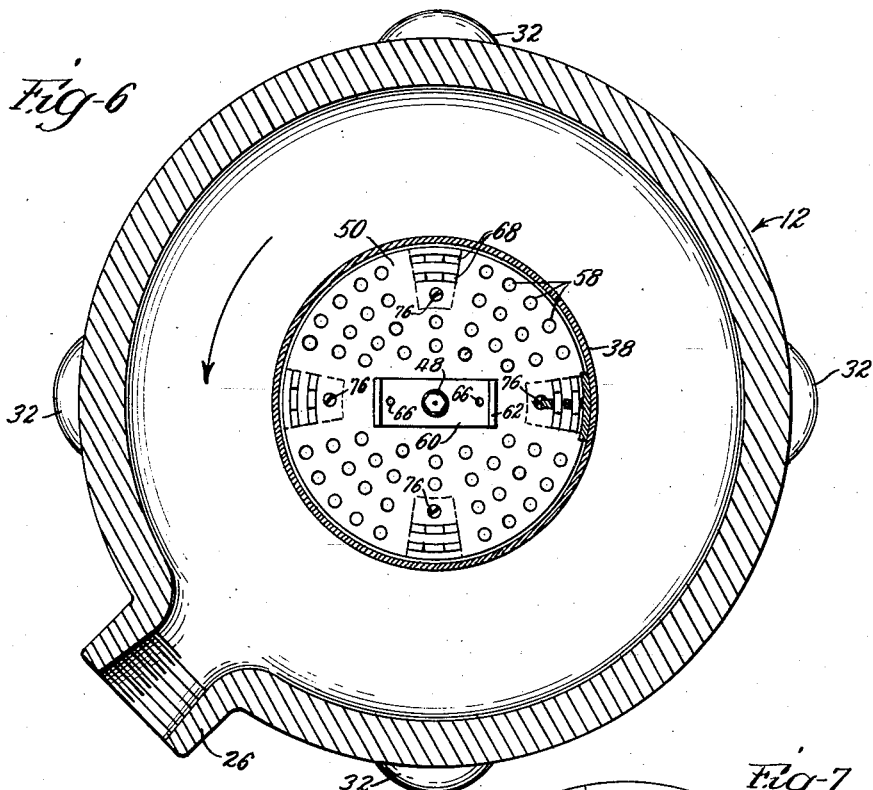
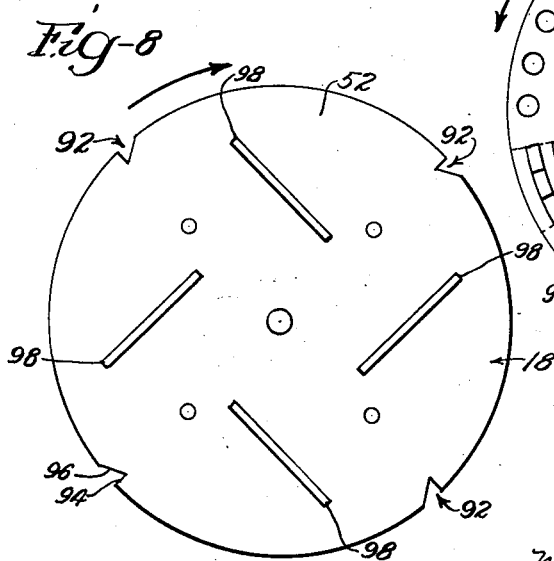
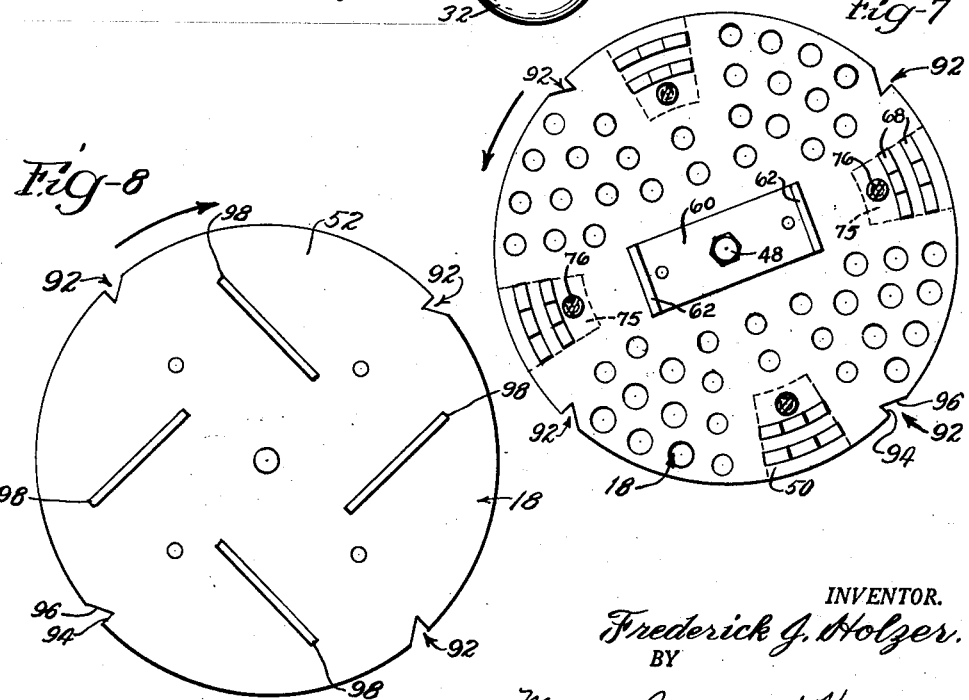
INVENTOR.
Frederick J. Holzer.
BY
Mann, Brown and Hansmann
Attys.

United States Patent Office 2,852,199
Patented Sept. 16, 1958

2,852,199

FOOD WASTE DISPOSER

Frederick J. Holzer, Flossmoor, Ill., assignor, by mesne assignments, to Frederick J. Holzer, Anthony B. Ross, and James J. Becher, trustees Application July 2, 1954, Serial No. 440,964

10 Claims. (Cl. 241—21)

The present invention relates to a food waste disposer, and more particularly to a food waste disposer in which food waste is reduced in size to relatively fine particles so that it may be disposed of by introducing it into sewage disposal systems.

Food waste consists of predominantly organic material of animal or plant origin containing water and carbohydrates. When allowed to stand for any length of time at moderate temperatures decomposition sets in, resulting in unpleasant odors, unsightly refuse, and the attraction of flies and other vermin. The conventional manner of disposing of food waste, commonly called garbarge, consists of accumulating the waste in suitable sized containers, which are emptied from time to time by persons employed to dispose of garbage, who usually cart the garbage away in trucks to the point of disposal, such as an incinerator. Such containers must necessarily be located about one's premises for easy access by those employed to dispose of the garbage, and, by the nature of garbage, this arrangement tends to result in the presence of unsightly refuse containers, unpleasant odors and the attraction of vermin and undesirable animals to the premises. The problem of food waste disposal is particularly important in commercial establishments such as restaurants, supermarkets, canneries and the like. In these fields of endeavor it is mandatory that food waste be disposed of immediately and since relatively large amounts of food waste are continually accumulating it is desirable that means be provided which continuously processes and removes the waste from the premises.

Recently a method of food disposal has come into use wherein the food waste is reduced in size to very small particles and then flushed into the sewage disposal systems. This method, called the "water carrier" method, enables one to dispose of food waste immediately, thus avoiding the need for storage receptacles, garbarge collection crews, and disposal installations, and eliminating the unpleasantness of having decomposing food stored on the premises.

In the latter method of food waste disposal, it is very important that the food waste be carefully treated to provide waste particles of very small size before the waste is introduced into the sewage system. Thus, the food waste must be reduced in size from the chunks or pieces remaining after preparation of food or packaging of food to particles of one-eighth to one-quarter inch in size. I have found that the existing devices are in the main unsatisfactory, particularly in the case of commercial establishments of the type mentioned above, in that they do not reduce all types of food waste to the required size, they are bulky to handle and expensive to install.

It is therefore an object of this invention to provide a food waste disposer which will reduce all types of food waste to the required size with equal facility.

It is a further object of the invention to provide a method of treatment of food waste which results in a mixture of water and food waste particles that may readily be assimilated by any sewage disposal system.

It is yet another object of the invention to provide a dynamically balanced food waste disposer unit having a low center of gravity which results in a high degree of stability in operation and which need not be fixed to a rigid supporting structure, such as a cement stand or base.

A further object of the invention is to provide a portable food waste disposer which is peculiarly adapted for use in commercial establishments wherein the device is capable of being readily moved to various points where food waste accumulates, wherein the device is capable of continuous operation over long periods of time, and wherein the device is capable of handling large quantities of all types of food waste.

According to the present invention, I provide a device comprising a round hopper fixed to a round hollow supporting base and in concentric relationship therewith. A motor actuated drive shaft is mounted at the axial center of said base and extends vertically upward into the lower portion of the round hopper. A cutter head or rotor is fixed to the upper end of said shaft for rotation therewith and within the lower portion of the hopper; the head or rotor comprises a pair of spaced-apart round plates of slightly less diameter than the diameter of the lower portion of the hopper. The upper plate is formed with a plurality of perforations of relatively small size which communicate with the space between the plates, and the upper plate carries on the upper surface thereof a pair of knife blades spaced adjacent to and equidistantly from the center of the head. Fixed between the plates and extending upwardly through the upper plate are a plurality of saw-like shearing blades which are symmetrically located adjacent the periphery of the head. The shearing blades pass through appropriately spaced notches in a plate, or series of plates, fixed to the wall of the hopper. The shearing blades include laterally extending bases positioned within the space between the plates, and the bases each are provided with a shoulder which presents a cutting edge adjacent the periphery of the head or rotor. The lower portion of the hopper extends into the hollow portion of the base, and is provided with a plurality of perforations of relatively small size with which the space between the plates of the head is aligned. The hollow base is connected to a pipe that may lead to a conventional sewage disposal system.

Food waste is placed in the hopper together with a quantity of water and the cutter head or rotor is actuated. The knife blades, which may be termed the primary chopper, chop up the larger particles of food, the pieces of which are then carried by centrifugal force to the orbit of the shearing blades. The shearing blades cooperate with the fixed plate or plates to provide a shearing cutting action which is particularly effective in reducing the size of fibrous materials. These blades reduce the size of the food waste particles to the point where the particles may be forced through the perforations in the upper plate, this action also tending to shear the waste particles into smaller pieces or particles. After passing through the top plate the food particles and water are urged by centrifugal force outward of the axis of the head or rotor and through the perforations in the lower portion of the hopper. The cutting edges on the bases of the shearing blades operate adjacent the inside surfaces of these perforations and provide a further cutting action on the waste, as passage of the waste through the last mentioned perforations occurs. The mixture of waste particles and water passes from the perforations in the hopper into the hollow base from which it may be discharged into a sewage system.

From the foregoing, it will be obvious that the present invention provides substantial advantages over prior practices. For example, the food waste is acted on by a dynamically balanced cutter head or rotor which subjects the food particles to a number of types of cutting action and which is capable of reducing all types of food waste to small particles. Moreover, the unit as a whole is dynamically balanced and does not require an expensive mounting platform, such as a cement base.

In addition to the foregoing, it is an object of the present invention to provide a food waste disposer which is economical of manufacture, convenient in use, capable of ready installation, and quiet in operation.

Other objects and advantages of the present invention will become apparent in the following description of preferred embodiments of the food waste disposer of the present invention, and the preferred use thereof.

Now, in order to acquaint those skilled in the art with the method of the present invention, and with the manner of making and using the food waste disposer of the invention, I shall describe, in connection with the accompanying drawings, several preferred embodiments thereof.

In the drawings:

Figure 3 is a perspective view of the cutter head or rotor employed in the device illustrating the cutting means carried thereby;

Figure 4 is a perspective view of the lower portion of the hopper of the device, within which the cutter head or rotor operates;

Figure 6 is a horizontal cross-sectional view looking down toward the top of the cutter head;

Figures 7 and 8 are top and bottom plan views, respectively, of the cutter head or rotor, illustrating modifications thereof; and Figure 9 is a vertical cross-sectional view through the lower portion of the hopper illustrating a modification thereof used in connection with the cutter head or rotor of Figures 7 and 8.

Figure 1:
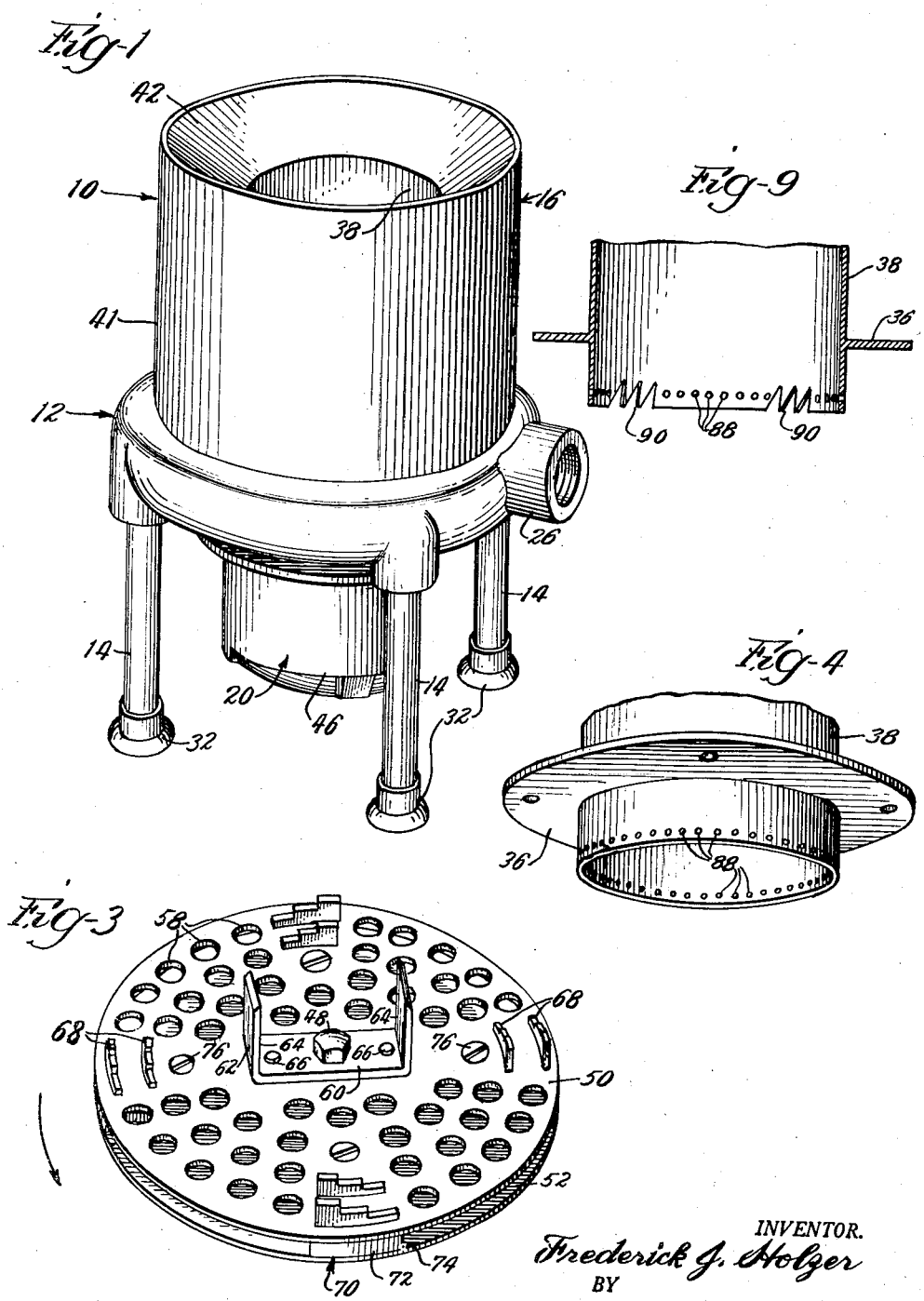
Figure 1 is a perspective view of a preferred embodiment of the invention.
Figure 2:
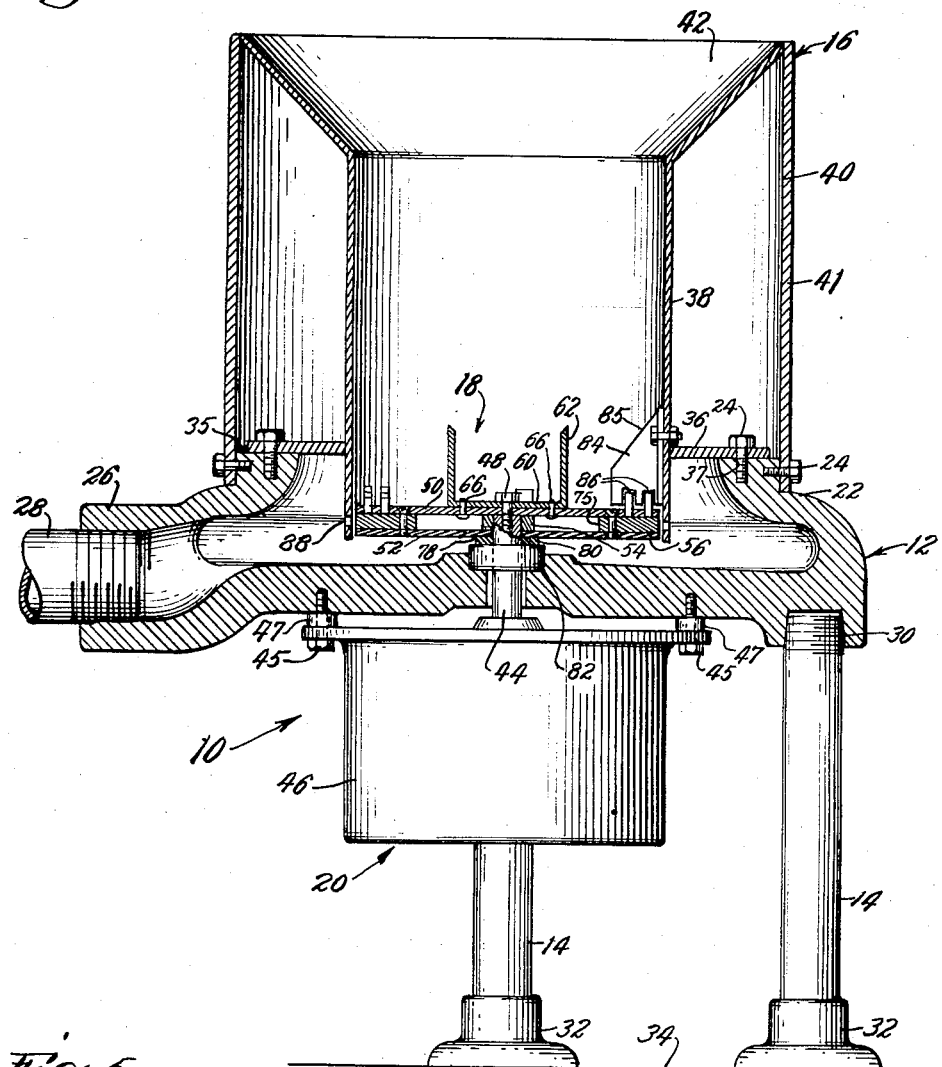
Figure 2 is a vertical cross-sectional view through the axial center of the device, showing some parts in elevation.
Figure 5:
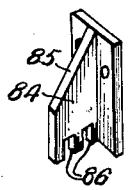
Figure 5 is a perspective view of the plate with which the shearing blades of the cutter head cooperate.

Referring now more particularly to the drawings, wherein like reference numerals are employed to indicate like parts, reference numeral 10 of Figures 1 and 2 generally indicates a preferred embodiment of the invention comprising a hollow base 12 including adjustable legs 14, hopper and side enclosure 16, cutter head or rotor 18, and power means 20.

The base 12 may be made of cast iron or the like, to minimize vibration, and is formed with an upwardly extending neck 22 to which the hopper and side enclosure 16 is secured by suitable means, such as bolts 24, and an outlet 26 which may be threaded for connection to a standard size pipe 28 that leads to the point of disposal. The base 12 is formed with four tapped holes 30 which may be screw-threaded to receive the legs 14. These legs may be provided with screw-threadedly mounted feet 32. This arrangement of the legs permits the unit to be adjusted in height and to allow for irregularities in the supporting surface 34. The top of the neck of the base is provided with a finished flat surface 35 and is formed with a plurality of tapped holes 37 for securing the flange 36 of the hopper 38. The hopper 38 is secured in any suitable manner, as by welding or the like, to the side enclosure structure 40 including a vertical side wall 41 that is fixed to the base 12 and an inclined top wall 42 that is fixed to the top of the hopper.

The axial center of the base 12 is formed to receive the shaft 44 of electric motor 46 which is fixed to the under surface of base 12 by bolts 45. Spacers 47 may be employed to space the motor from base 12 to keep vibration at a minimum. The upper end of the shaft 44 is drilled and tapped to receive the bolt 48 which fixes the cutter head or rotor 18 to the shaft. A suitable lock washer is preferably employed in connection with bolt 48.

The cutter head or rotor 18 comprises a pair of upper and lower spaced-apart plates 50 and 52. As shown in Figure 2, the plates 50 and 52 are separated by the spacer 54 and the bases 70 of the shearing blades, more fully discussed hereinafter. Referring to Figure 3, it will be seen that the upper plate is formed with a plurality of perforations 58 of relatively small size, which may be termed straining means, and which communicate with the space between the plates. Fixed to the upper surface of plate 50 is the U-shaped member 60, the arms 62 of which are provided with sharpened edges 64 forming knife blades. The member 60 may be secured to the plate 50 by bolt 48, as shown, or by any other suitable means, and includes the depending studs 66 which are disposed in holes or notches appropriately formed in the upper plate 50.

Projecting upwardly through slots formed in the upper plate are the saw-like, three-stepped, shearing cutter blades 68, which may also be termed grinders, and which are provided in pairs and are located symmetrically adjacent the periphery of the cutter head. The blades 68 project upwardly through slots formed in plate 50 from bases 70 which are fixed between the plates 50 and 52 by screws 76 securing these plates to each other. As shown in Figure 3, the bases include a rounded side portion 72 disposed in the plane of the periphery of the cutter head, one shoulder of which is formed with a cutting edge 74, and a flange portion 75 (see Figure 7) through which the screws 76 pass. The lower plate 52 is imperforate, except for four holes for receiving screws 76 which secure the plates to each other. The bottom plate 52 is recessed slightly on the under side thereof at 78 to receive a resilient seat 80 which is urged into contact with a rigid ring 82 fixed in base 12, through which the shaft 44 extends, to provide a water-tight seal. The necessary compression force is provided by the action of the bolt 48 securing the cutter head to the shaft 44.

Fixed to the inner surface of the hopper 38 is the plate 84 which is formed with slots 86 machined to closely accommodate the pairs of shearing blades 68. The lower end of the hopper, which depends into the hollow portion of the base 12, is formed with a ring of perforations 88, which may be termed straining means, and with which the space between the plates 50 and 52 is aligned. Perforations 88 are preferably somewhat smaller than the perforations 58 in upper plate 50.

In operation, the motor for actuating the cutter head 18 is turned on and the cutter head is rotated at a relatively high rate of speed, for instance, seventeen hundred and fifty revolutions per minute, in the direction indicated by the arrow in Figures 3 and 6. It is to be understood, however, that other speeds may be employed though it is preferred that the head or rotor be rotated at a relatively high speed. Food waste and a quantity of water are fed into the hopper 38, preferably continuously for best results, and are mixed as the blades of the cutter head act on the food waste. The hopper acts as a conduit for delivering the mixture to the revolving cutter head or rotor 18. The knife blades 62 chop the waste food into small pieces and these pieces as well as fibrous matter move under centrifugal force toward the side wall of the chamber. A good portion of the material which is not fibrous in nature tends to be broken up into small enough pieces by the knife blades and the rotating force impressed on the mixture to pass through the perforations 58; the fibrous materials and other relatively tough unbroken chunks are acted on by the shearing blades 68 in cooperation with the plate 84. Due to the angled side 85 on the upper portion of the plate 84, the material being sheared tends to move back toward the center of the mixture. The two types of cutters act on the food waste until it is in sufficiently small particles to pass downwardly with the water through the perforations in the plate 50 into the space between the plates 50 and 52. The small particles are further reduced in size during this step due to the shearing force acting on them as they pass through the relatively small perforations. The mixture of food waste and water is then thrown outwardly of the axis of the cutter head or rotor 18 by centrifugal force toward the periphery of the cutter head or rotor and the perforations 88 of the hopper. As the mixture of the food waste and water passes from the space between the plates 50 and 52 into the perforations 88, the cutting edge 74 acts to further reduce the particles in size and force the particles through the perforations 88, which are preferably smaller than perforations 58. Upon leaving the perforations 88, the mixture of water and food waste enters the hollow portion of the base and passes from the base 12 into pipe 28 from which it may pass into a sewage system port.

One of the salient features of the device is that it creates a pumping action which draws the mixture of food waste and water through the cutter head and hopper perforations with substantial force. This aids materially in the rapid disintegration of the food waste. As the rotation of the cutter head or rotor builds up to total speed a pressure differential builds up and atmospheric pressure then lends its aid in forcing the mixture through the device. It will therefore be seen that the individual particles of food waste are subjected to substantial disintegrating forces as they travel through the disposer.

It will be apparent that the symmetrical disposition of the various elements provides a dynamically balanced device having a relatively low center of gravity which does not require a rigid mounting platform, such as a cement stand. Moreover, the device includes only one moving part, namely, the cutter head or rotor 18, which insures that a maximum of operation will be obtained with a minimum of wear. The unit 60 and the shearing blades may be readily replaced when desired by merely removing the cutter head from the machine. The action of the various cutting blades and the large amount of centrifugal force acting on the food waste insures that the various perforations and cutting blades will not require constant maintenance to avoid clogging of the blades and perforations. The fact that the device is dynamically balanced insures that the operation of the disposer will be accompanied by a minimum of noise. However, I contemplate that sound absorbing means may be inserted in the space surrounding the hopper 38 and above the flange 36 to eliminate the sound of the blades acting on the food waste.

The size and nature of the motor may be varied to meet particular requirements, though I prefer to use electric motors of from one to five horsepower on the disclosed embodiments. The food disposer herein disclosed is completely self-cleansing and is capable of handling a large capacity for extended periods. The size of the food waste particles leaving the unit may be varied by varying the sizes of perforations 58 and 88.

Illustrated in Figures 7 and 9 is a modification of the embodiment of Figures 1–5 wherein two teeth 90 are formed in the lower portion of the hopper in each quadrant thereof at approximately the angle shown in Figure 9, and the periphery of each of the plates 50 and 52 is notched as shown at 92 in Figure 7. In this embodiment fibrous materials which have passed into the space between the plates 50 and 52, and which tend to become hung up between the cutter head and the hopper wall are urged into contact with the teeth 90 by the notches 92, thereby being cut into small pieces which will be carried through the perforations 88. The notches 92 are preferably placed in advance of the shearing blades 68, in the direction of rotation of the cutter head 18, approximately in the position shown in Figure 7, and the notches are formed with a radial side 94 and an inclined side 96 at an angle of approximately sixty degrees with respect to side 94.

Figure 8 illustrates a modification of the embodiment of Figures 7 and 9 wherein fins or ridges 98 are fixed to the bottom surface of the bottom plate 52 in the relationship illustrated to provide an open impeller centrifugal pump action on the mixture of water and food waste particles collecting under the cutter head 18 (see Figure 2) after the mixture has passed through the perforations 88. This action tends to keep the surfaces around and under the cutter head or rotor clean.

The foregoing description and the drawings are given merely to explain and illustrate my invention, and the manner in which it may be performed, and the invention is not to be limited thereto, except in so far as the appended claims are so limited since those skilled in the art who have my disclosure before them will be able to make modifications and variations therein without departing from the scope of the invention.

I claim:

1. A device the type described comprising a hopper having a lower open end, a hollow base supporting said hopper, a cylindrical member mounted for rotation about its central axis adjacent the lower end of said hopper, said member comprising a pair of spaced-apart upper and lower plates, said member being substantially the same size as said lower open end of said hopper, cutting means fixed to said member and projecting upwardly from the upper surface thereof, said cutting means comprising a pair of knife blades positioned adjacent the axial center of said member and spaced equidistantly from said center, and a plurality of shearing blades positioned outwardly of said knife blades, said shearing blades being symmetrically spaced on said member, rigid means fixed to said hopper and cooperating with said shearing blades to provide a shearing cutting action, said upper plate being formed with a plurality of perforations communicating with the space between said plates, said hopper being formed with a plurality of perforations adjacent said member and in alignment with said space, said last mentioned perforations being in communication with said hollow base, and cutting means adjacent the periphery of said member and positioned in said space, said cutting means presenting a cutting edge adjacent said second mentioned perforations.

2. A food disposal device comprising a hopper, a hollow base supporting said hopper, a cutter head mounted for rotation about its central axis adjacent the lower portion of said hopper, said cutter head comprising a pair of spaced-apart upper and lower plates, a pair of upright knife blades positioned adjacent the axial center of said cutter head and spaced equidistantly from said center, a plurality of shearing blades symmetrically positioned outwardly of said knife blades, rigid means fixed to said hopper and cooperating with said shearing blades to provide a shearing cutting action, said cutter head substantially closing off said hopper, said upper plate being formed with a plurality of perforations communicating with the space between said plates, said hopper being formed with a plurality of perforations adjacent said cutter head and in alignment with said space, said last mentioned perforations being in communication with said hollow base, and cutting means fixed to said cutter head adjacent the periphery thereof and positioned in said space, said cutting means presenting a cutting edge adjacent said second mentioned perforations.

3. A food disposal device comprising a round hollow base, a round hopper concentrically supported on said base, a drive shaft mounted at the axial center of said base and extending into the lower portion of said hopper, power means operatively connected to said drive shaft, a cutter head fixed to said drive shaft within the lower portion of said hopper, said cutter head substantially filling the opening between said hopper and said base, said cutter head comprising a pair of spaced-apart upper and lower plates, a pair of upright knife blades positioned adjacent the axial center of said cutter head and spaced equidistantly from said center, a plurality of shearing blades symmetrically positioned outwardly of said knife blades, rigid means fixed to said hopper and cooperating with said shearing blades to provide a shearing cutting action, said upper plate being formed with a plurality of perforations communicating with the space between said plates, said hopper being formed with a plurality of perforations adjacent said cutter head and in alignment with said space, said last mentioned perforations being in communication with the hollow portion of said base, cutting means fixed to said cutter head adjacent the periphery thereof and positioned in said space, said cutting means presenting a cutting edge adjacent said second mentioned perforations, and sound insulating means surrounding said hopper.

4. A food disposal device comprising a round hopper, a round hollow base supporting said hopper, a drive shaft mounted at the axial center of said base and extending into the lower portion of said hopper, power means operatively connected to said drive shaft, a cutter head fixed to said drive shaft within the lower portion of said hopper, the lower portion of said hopper extending into the hollow portion of said base, said cutter head comprising a pair of spaced-apart upper and lower plates, a pair of upright knife blades positioned adjacent the axial center of said cutter head and spaced equidistantly from said center, a plurality of shearing blades symmetrically positioned outwardly of said knife blades, rigid means fixed to said hopper and cooperating with said shearing blades to provide a shearing cutting action, said upper plate being formed with a plurality of perforations communicating with the space between said plates, the lower portion of said hopper being formed with a plurality of perforations adjacent said cutter head and in alignment with said space, said portion of said hopper being further formed with a plurality of teeth in alignment with said head, said last mentioned perforations being in communication with the hollow portion of said base, cutting means fixed to said cutter head adjacent the periphery thereof and positioned in said space, said cutting means presenting a cutting edge adjacent said second mentioned perforations, said cutter head having a notch formed therein in advance of each shearing blade presenting a further cutting edge along the periphery of said cutter head and adjacent said teeth.

5. The device set forth in claim 4 wherein said cutter head is provided with a plurality of fins fixed to the bottom thereof positioned to urge the material in said base below said cutter head outwardly of the cutter head.

6. A cutter head for food disposal devices comprising a pair of spaced-apart plates, a pair of upright knife blades positioned adjacent the axial center of one of the plates and spaced equidistantly from said center, a plurality of shearing blades symmetrically positioned outwardly of said knife blades, said one plate being formed with a plurality of perforations communicating with the space between said plates and the other plate being imperforate, and cutting means fixed to said cutter head adjacent the periphery thereof and positioned in said space.

7. A food waste disposer comprising a generally horizontally disposed cylindrical member mounted for rotation about its axial center, a conduit leading to the upper face of and surrounding said member, said member and said conduit being proportioned to prevent any substantial flow between said conduit and said member axially of said conduit, comminuting means secured to said face of said member, said member being formed with an internal chamber that extends radially of said member to the periphery thereof, said chamber being open at said periphery of said member, said face of said member being formed with straining means that is in communication with said chamber, said conduit in the portion thereof that surrounds said member being formed with straining means that is aligned with the opening of said chamber, and means for rapidly rotating said member.

8. The disposer set forth in claim 7 wherein said member is provided wtih further comminuting means at the periphery thereof and in alignment with said straining means of said conduit.

9. A food waste disposer comprising a hopper, a hollow base supporting said hopper, a cylindrical member mounted for rotation about its central axis within the lower end of said hopper, said member substantially filling said lower end of said hopper, means for rotating said member at a relatively high speed, said member being formed with an internal chamber that extends from a point adjacent the axial center thereof to the periphery thereof, said chamber being open at said periphery of said member, cutting means fixed to said member and projecting upwardly from the upper surface thereof, said cutting means comprising a pair of knife blades fixed to said member adjacent the axial center thereof, and a plurality of shearing blades positioned outwardly of said knife blades, rigid means fixed to said hopper and cooperating with said shearing blades to provide a shearing cutting action, said upper surface of said member being formed with a plurality of perforations communicating with said chamber, said hopper in the portion thereof that surrounds said member being formed wtih straining means that is aligned with the opening of said chamber, said straining means being in communication with said hollow base.

10. The method of treating food waste including the steps of diluting the waste with water, subjecting the mixture of waste and water to a rapid rotating force, cutting the rotating wase into relatively small particles, straining the rapidly rotating mixture by passing it in a direction parallel to the axis of rotation of the mixture through a multiplicity of openings, subjecting all the strained mixture of waste and water to rapid rotation to cause all said material to move radially outwardly by centrifugal force, and then straining the outwardly moving strained mixture by throwing all of its through a circumferential screening zone characterized by openings smaller than said first named openings.

References Cited in the file of this patent

UNITED STATES PATENTS

| 2,012,680 | Hammas | Aug. 27, 1935 |
| 2,482,124 | Powers | Sept. 20, 1949 |
| 2,536,929 | Hammell | Jan. 2, 1951 |
| 2,578,274 | Weigham et al. | Dec. 11, 1951 |
| 2,594,250 | Tranbarger | Apr. 22, 1952 |
| 2,767,927 | Green | Oct. 23, 1956 |

FOREIGN PATENTS

| 682,046 | Great Britain | Nov. 5, 1952 |
| 833,172 | Germany | Mar. 20, 1952 |
| 1,076,633 | France | Apr. 21, 1954 |